J. H. Johnson,

Hay Press.

No. 108,599. Patented Oct. 25. 1870

Jos. H. Johnson
Inventor

Witnesses
Chas. A. Pettit
Thos. H. D. Durand by [signature]
his Attorneys

J. H. Johnson,
Hay Press.
No. 108,599.   Patented Oct. 25, 1870.
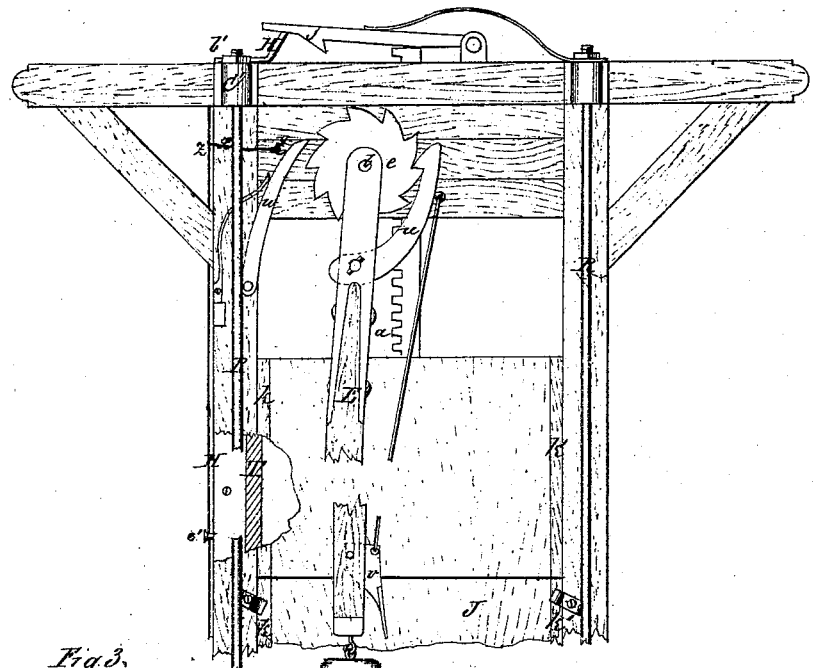
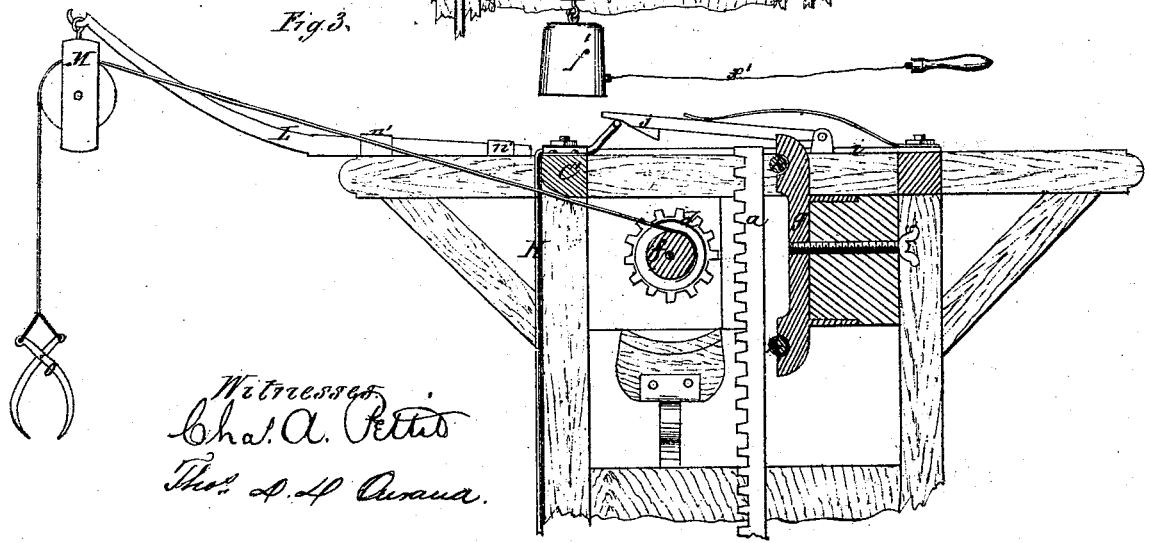
Witnesses:
Chas. A. Pettit
Thos. D. H. Aurand
Jos. H. Johnson, Inventor.
by _____ his Attorneys.

United States Patent Office.

JOSEPH H. JOHNSON, OF GRIFFIN, GEORGIA.

Letters Patent No. 108,599, dated October 25, 1870.

IMPROVEMENT IN HAY AND COTTON-PRESSES.

The Schedule referred to in these Letters Patent and making part of the same.

*To all whom it may concern:*

Be it known that I, JOSEPH H. JOHNSON, of Griffin, in the county of Spaulding and State of Georgia, have invented a new and improved Cotton and Hay-Press; and I do hereby declare the following to be a full, clear, and exact description of the same, reference being had to the accompanying drawing making a part of this specification, in which—

Figure 2 is a view of the opposite side, showing the pendulum-lever.

Figure 3 is a transverse vertical section, showing the internal construction of a portion of the machine.

Figure 1:
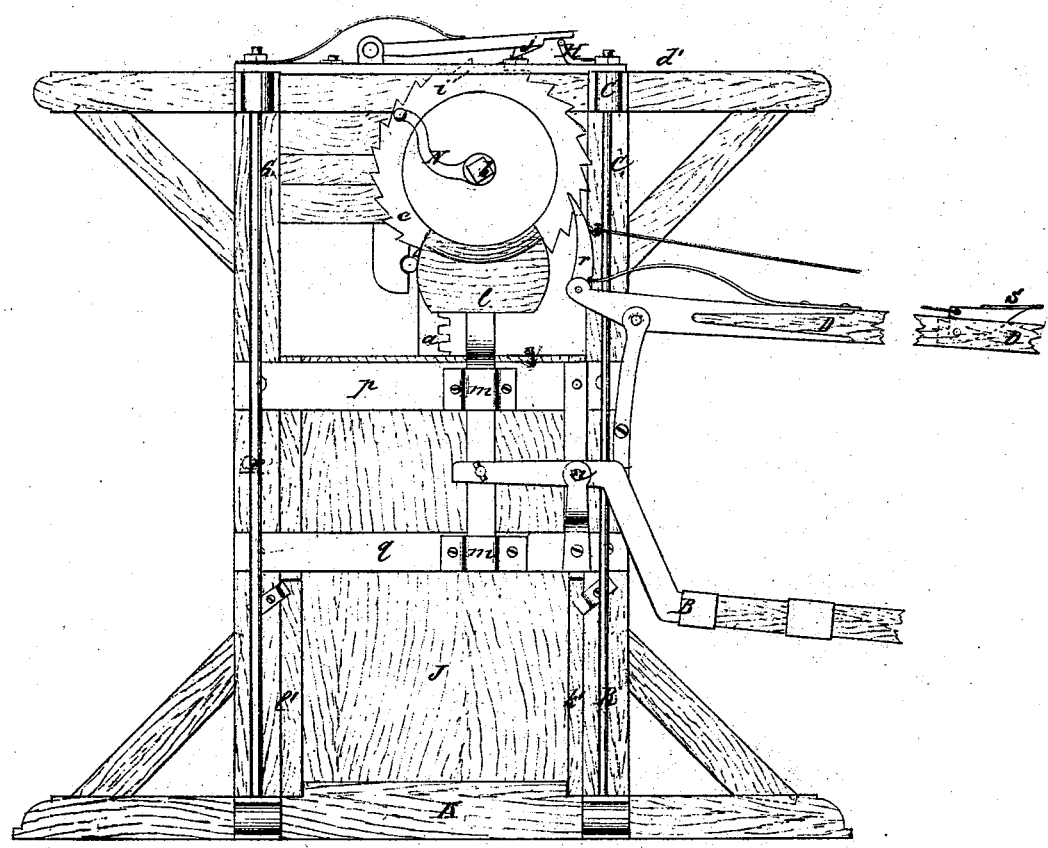
Figure 1 is a side view of the machine, showing the brake and its lever, and one of the levers for operating the shaft.

The first part of the invention consists in attaching the platen to a rack, which is elevated and depressed by a pinion-wheel secured to a shaft that is operated by a ratchet-wheel, pawl, detent, and lever.

The second part of the invention consists in operating the rack either in combination with the ratchet-wheel, pawl, detent, and lever, just mentioned, or separately, by a pendulum-lever, ratchet-wheel, pawl, and detent, arranged at the opposite end of the shaft.

The third part of the invention consists of a brake and lever of peculiar construction, attached to the press, and arranged in such a manner that they can be operated by the foot, so as to hold the ratchet-wheel, and thereby the shaft to which it is secured, while the detents, pawls, levers, &c., are being removed to permit the rack and platen to be raised from the bale of cotton or hay.

In the drawing—

$a$ is the rack, to which the platen is attached.

$b$ is the shaft, to which the ratchet $c$, pinion $d$, spool $f$, and ratchet $e$, are secured.

$g$ is a sliding frame, provided with friction-rollers $h$ and the thumb-screw $i'$. When drawn slightly back it permits the rack $a$ to fall out of gear; when screwed up it holds the rack in gear, while the friction-rollers $i'$ permit it to work freely.

The detent $j$ is attached to the plate $i$, which is provided with the slot $k$, through which the teeth of the ratchet $c$ slightly protrude.

$l$ is a brake, which is worked in the loops $m$ by the crooked lever B having its fulcrum on the pivot $n$ in the bar $o$.

The bars $p$ and $q$ are secured to the uprights C and G, the loops $m$ and bar $o$ being secured to the bars $p$ and $q$.

The lever D has the pawl $r$ connected to the thumb-lever $s$ by a cord. A recess in its under side, near the pawl $r$, fits over the pivot $t$, formed on the end of a bar secured to the uprights at the end of the press, so that by simply withdrawing the pawl from the ratchet by pressing upon the thumb-lever $s$, the lever D can be taken from the pivot $t$.

The ratchet-wheel $e$ is provided with the detent $w$, connected with the lever H by a wire, $x$, fastened to the detent at $y$, and to the lever at $z$.

The lever H passes through a loop, $b'$, on the cross-piece $c'$, parallel with the girder $d'$, where it turns at a right angle with the loop $b'$, passes in the direction of the outside of the girder $d'$, and under the detent $j$. By drawing the lever H toward the upright C, both detents $j$ and $w$ are at the same time withdrawn from their respective ratchets, and withheld by placing the lever H behind the pin $e'$.

E is the pendulum-lever, provided with the pawl $u$, connected to the thumb-lever $v$ by a cord, and secured to the shaft $b$ so as to be removable at pleasure.

A cord, $x'$, is attached to the weight $f'$, by which the pendulum E can be vibrated to aid in depressing the platen.

The side doors J, and also the end-doors, (not shown,) have the strips $k'$ at each end.

The sills K are mortised to receive the lower edges of the doors, and the lower end of the strips $k'$.

The end doors, and in fact the entire ends of the box, protrude inside of the uprights, as at T, sufficiently far to permit the bale of cotton or hay to be rolled out at the side door J, after it has been formed.

The arm L is securely attached to the girder $d'$, by the bands or loops $n'$.

A cord is run over the pulley M, and one end of it attached to the spool $f$, and the other provided with the tongs O.

The bale of cotton or hay can be raised after first throwing the rack out of gear, the press being empty, by working the shaft $b$, using either the lever D or E, or the crank N.

When raised to a proper height the brake $l$ can be applied, the detents raised by placing the power-end of the lever H back of the pin $e'$, the lever D or E may be removed, and the bale lowered into the wagon.

The rods R have heads at their lower ends, and nuts and screws at their upper ones, and are used to strengthen the frame of the press.

Having thus described my invention,

What I claim as new, and desire to secure by Letters Patent, is—

1. The rack $a$, shaft $b$, with or without the spool $f$ and ratchet $e$, but provided with the pinion $d$ and ratchet $c$, plate $i$ having the detent $j$, lever D provided with the pawl $r$, and thumb-lever $s$, all arranged as described, for the purpose specified.

2. The pendulum-lever E, provided with the pawl $u$, thumb-lever $v$, and weight $f'$, ratchet $e$, and detent $w$, arranged relatively to each other and to the shaft $b$, provided with a pinion, $d$, substantially as and for the purpose specified.

3. The pendulum-lever E, provided with the pawl $u$, thumb-lever $v$, and weight $f'$, ratchet $e$ and detent $w$, arranged relatively to each other and to the shaft $b$, provided with the pinion $d$, in combination with the lever D, provided with the pawl $r$ and thumb-lever $s$, ratchet $c$, plate $i$, and detent $j$, arranged relatively to each other and the shaft $b$, substantially as described, for the purpose set forth.

4. The combination of the shaft $b$ and spool $f$, with brake $l$ and lever B, arranged as and for the purpose specified.

5. The lever H, wire $x$, and detents $j$ and $w$, in combination with the ratchets $c$ and $e$, when arranged as and for the purpose specified.

JOSEPH H. JOHNSON.

Witnesses:
  GEO. W. MABEE,
  T. B. MOSHER.